United States Patent [19]

Schmalstieg et al.

[11] Patent Number: 5,756,751

[45] Date of Patent: May 26, 1998

[54] COMPOUNDS CONTAINING ALKOXYSILANE GROUPS AND HYDANTOIN GROUPS

[75] Inventors: Lutz Schmalstieg, Köln; Rainer Rettig, Lindlar; Götz Limbeck, Overath, all of Germany; Richard R. Roesler, Wexford; Edward P. Squiller, Pittsburgh, both of Pa.; Philip E. Yeske, Köln, Germany; Stanley F. Siranovich, Imperial, Pa.

[73] Assignees: Bayer Aktiengesellschaft, Leverkusen, Germany; Bayer Corporation, Pittsburgh, Pa.

[21] Appl. No.: 855,423

[22] Filed: May 13, 1997

[30] Foreign Application Priority Data

May 15, 1996 [DE] Germany ............... 196 19 538.1

[51] Int. Cl.[6] ........................................ C07D 231/00
[52] U.S. Cl. ................ 548/110; 106/14.05; 106/14.16; 106/14.44; 528/17; 528/18
[58] Field of Search ............... 548/110; 106/14.05, 106/14.16, 14.44; 528/17, 18

[56] References Cited

U.S. PATENT DOCUMENTS

| | | | |
|---|---|---|---|
| 2,832,754 | 4/1958 | Jex et al. | 260/46.5 |
| 2,971,864 | 2/1961 | Speier | 117/124 |
| 3,676,478 | 7/1972 | Golitz et al. | 260/448.2 N |
| 4,481,364 | 11/1984 | Chu et al. | 556/413 |
| 5,126,170 | 6/1992 | Zwiener et al. | 427/385.5 |
| 5,236,741 | 8/1993 | Zwiener et al. | 427/385.5 |
| 5,364,955 | 11/1994 | Zwiener et al. | 556/418 |
| 5,554,709 | 9/1996 | Emmerling et al. | 528/27 |
| 5,661,109 | 8/1997 | Schafer et al. | 548/110 X |
| 5,677,464 | 10/1997 | Itoh et al. | 548/110 X |

FOREIGN PATENT DOCUMENTS

| | | |
|---|---|---|
| 676403 | 10/1995 | European Pat. Off. |
| 1190342 | 5/1970 | United Kingdom |
| 1243189 | 8/1971 | United Kingdom |
| 1243190 | 8/1971 | United Kingdom |

*Primary Examiner*—Paul F. Shaver
*Attorney, Agent, or Firm*—Joseph C. Gil; Thomas W. Roy

[57] ABSTRACT

The present invention relates to compounds containing alkoxysilane and hydantoin groups and corresponding to the formula

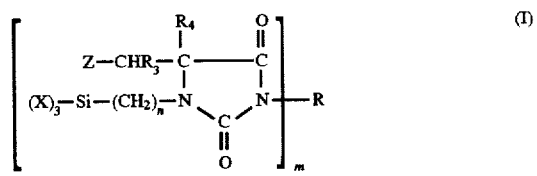

wherein X represents identical or different organic groups which are inert to isocyanate groups below 100° C., provided that at least one of these groups is an alkoxy group, Z represents $COOR_1$ or an aromatic ring, R represents the residue obtained by removing the isocyanate groups from an organic monomeric polyisocyanate, a polyisocyanate adduct or an NCO prepolymer, $R_1$ represents an organic group which is inert to isocyanate groups at a temperature of 100° C. or less, $R_3$ and $R_4$ are identical or different and represent hydrogen or organic groups which are inert to isocyanate groups at a temperature of 100° C. or less, n is an integer from 1 to 8 and m has an average value of 1.5 to 6.

The present invention also relates to the use of these compounds for the preparation coatings, sealants and adhesives.

21 Claims, No Drawings

COMPOUNDS CONTAINING ALKOXYSILANE GROUPS AND HYDANTOIN GROUPS

BACKGROUND OF THE INVENTION

1. Field of the Invention

The present invention relates to compounds containing alkoxysilane groups and hydantoin groups and to their use as coatings, sealants or adhesives.

2. Description of the Prior Art

Hydrolyzable organofunctional silanes are key components for linking conventional polymer chemistry with silicone chemistry. Compounds of technical importance for this purpose are in particular those corresponding to the formula $$(RO)_3Si-(CH_2)_3-Y$$

wherein

R is an alkyl group and

Y is a functional group.

Such compounds contain both hydrolyzable silyl groups, OR, which crosslink by "silane polycondensation" in the presence of moisture, and other functional groups, Y, which enable them to be chemically linked to conventional polymer materials. (See e.g., *Angew. Chem.* 98 (1986) 237–253.)

Hydrolyzable functional silanes corresponding to the above formula in which the functional group Y contains Zerewitinoff active H-atoms are potentially capable of modifying polyisocyanates. (See, e.g., WO 92/05212). Commercially available products suitable for this purpose contain $NH_2$ and/or NH groups as Zerewitinoff active H-atoms. Also available are compounds containing SH groups.

Alkoxysilanes containing SH groups are described, for example, in GB-A-1,102,251; EP-A-0,018,094; DE-A-1,162,818; -U.S. Pat. No. 3,590,065; U.S. Pat. No. 3,849,471; U.S. Pat. No. 4,082,790; U.S. Pat. No. 4,012,403; and U.S. Pat. No. 4,401,286. All alkoxysilanes containing SH groups have the unpleasant odor which is typical of mercaptans. The polymer may, therefore, have an unpleasant odor due to residues of these compounds.

α-Aminoalkyl silane derivatives which can be crosslinked by moisture may be prepared according to German Offenlegungs-schriften Nos. 1,812,504 and 1,812,562. The functional silanes described there have, however, failed to achieve technical importance due to the complicated process for their synthesis.

Alkoxysilanes containing amino groups are described, e.g., in *J. Org. Chem.* 36 (1971), p. 3120; DE-A-1,152,695; DE-A-1,271,712; DE-A- 2,161,716; DE-A-2,408,480; DE-A-2,521,399; DE-A-2,749,316; U.S. Pat. No. 2,832,754; U.S. Pat. No. 2,971,864; and U.S. Pat. No. 4,481,364. Common to all amino-functional silanes known in the art is the disadvantage of being extremely reactive with isocyanates. Therefore, it is difficult to react these alkoxysilanes with polyisocyanates due to the incompatibility, inhomogeneity and extremely high viscosities of the reaction products.

Alkoxysilane-functional polyurethanes which crosslink via silane polycondensation are known (see "Adhesives Age", 4/1995, p. 30 ff., for example). These alkoxysilane-terminated, moisture-curing, one-component polyurethanes are increasingly being used in the construction and car industries as flexible coating and sealing compounds and adhesives. Stringent demands regarding elongation, adhesive capacity and curing rate are required in these applications. In particular, the level of properties required by the car industry cannot be entirely achieved with currently available systems.

Alkoxysilane-functional polyurethanes which are prepared by the reaction of N-arylaminosilanes with NCO-prepolymers are known from EP-A 676,403. These products meet the car industry's requirements regarding their mechanical properties, for example, but the lack of thermal stability of the crosslinked polymers is a problem with the products. The reason for this deficiency is the known thermal instability of substituted, particularly aryl-substituted, ureas.

U.S. Pat. No. 5,554,709 discloses that amino-functional silanes can be reacted with certain NCO prepolymers, provided that the functionality of the prepolymer is less than 2.

U.S. Pat. No. 5,364,955 discloses that by initially reacting amino-functional silanes with maleic or fumaric acid esters to form secondary amino groups (i.e., aspartates), it is then possible to react these aspartates with NCO prepolymers without encountering incompatibility, inhomogeneity or extremely high viscosities in the reaction products. However, this reference does not disclose that it is possible to react all types of polyisocyanates with aspartates, i.e., polyisocyanate monomers and polyisocyanate adducts are not disclosed.

It is an object of the present invention to provide compounds containing alkoxysilane groups that are liquid and do not suffer from the incompatibility, inhomogeneity and viscosity problems encountered with the prior art reaction products of isocyanates with alkoxysilanes containing NH groups. It is an additional object of the present invention to be able to prepare these compounds from any type of polyisocyanate, including polyisocyanate monomers, polyisocyanate adducts and NCO prepolymers. It is also an object of the present invention to provide compounds containing alkoxysilane groups that can be cured by silane polycondensation to form coatings, sealants and adhesives. It is a further object of the present invention to provide compounds containing alkoxysilane groups which are prepared from NCO prepolymers and can be cured to provide products having good thermal stability as well as good elongation and adhesive capacity.

These objects may be achieved with the compounds containing alkoxysilane groups and hydantoin groups according to the present invention described hereinafter. These compounds are prepared by reacting polyisocyanates with aspartates (obtained by reacting aminoalkyl alkoxysilanes with maleic or fumaric acid esters) to form compounds containing urea groups and subsequently converting the urea groups to hydantoin groups.

SUMMARY OF THE INVENTION

The present invention relates to compounds containing alkoxysilane and hydantoin groups and corresponding to the formula

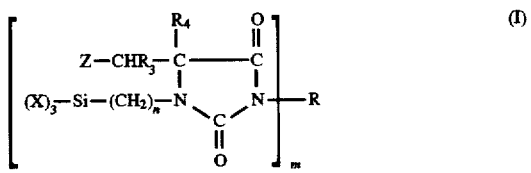

wherein

X represents identical or different organic groups which are inert to isocyanate groups below 100° C., provided that at least one of these groups is an alkoxy group, Z represents $COOR_1$, or an aromatic ring, R represents the residue obtained by removing the isocyanate groups from an organic monomeric polyisocyanate, a polyisocyanate adduct or an NCO prepolymer, $R_1$ represents an organic group which is inert to isocyanate groups at a temperature of 100° C. or less, $R_3$ and $R_4$ are identical or different and represent hydrogen or organic groups which are inert to isocyanate groups at a temperature of 100° C. or less, n is an integer from 1 to 8 and m has an average value of 1.5 to 6.

The present invention also relates to the use of these compounds for the preparation of coatings, sealants and adhesives.

DETAILED DESCRIPTION OF THE INVENTION

The compounds containing alkoxysilane groups and hydantoin groups of formula I are prepared by heating the corresponding compounds containing urea groups at elevated temperatures to convert the urea groups to hydantoin groups. The compounds containing urea groups correspond to formula II

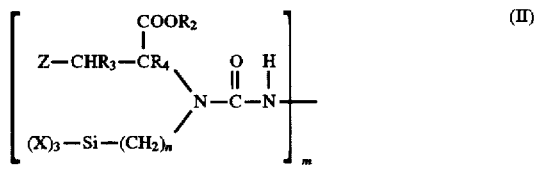

The compounds of formula II are prepared by reacting polyisocyanates with compounds containing alkoxysilane and aspartate groups (secondary amino groups) corresponding to the formula

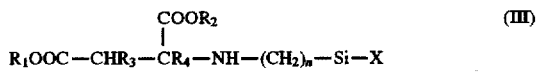

to form compounds containing alkoxysilane and urea groups.

The compounds of formula III are prepared by reacting aminoalkyl alkoxysilanes corresponding to the formula

with maleic, fumaric or cinnamic acid esters corresponding to the formula

In formulas I to V

X represents identical or different organic groups which are inert to isocyanate groups below 100° C., provided that at least one of these groups is an alkoxy group, preferably alkyl or alkoxy groups having 1 to 4 carbon atoms, more preferably alkoxy groups;

Z represents $COOR_1$, or an aromatic ring, preferably $COOR_1$,

R represents the residue obtained by removing the isocyanate groups from an organic monomeric polyisocyanate, a polyisocyanate adduct or an NCO prepolymer, preferably an organic monomeric polyisocyanate or a polyisocyanate adduct;

$R_1$ and $R_2$ are identical or different and represent organic groups which are inert to isocyanate groups at a temperature of 100° C. or less, preferably alkyl groups having 1 to 8 carbon atoms, more preferably alkyl groups having 1 to 4 carbon atoms and most preferably methyl, ethyl or butyl groups, $R_3$ and $R_4$ are identical or different and represent hydrogen or organic groups which are inert towards isocyanate groups at a temperature of 100° C. or less, preferably hydrogen and n is an integer from 1 to 8, preferably 2 to 4 and more preferably 3 and m has an average value from 1.5 to 6 (the preferred values depend upon the type of residue R).

Especially preferred are compounds in which X represents methoxy, ethoxy groups or propoxy groups, more preferably methoxy or ethoxy groups and most preferably methoxy groups, and n is 3.

Examples of suitable aminoalkyl alkoxysilanes of formula IV include 2-aminoethyl-dimethylmethoxysilane; 6-aminohexyl-tributoxysilane; 3-aminopropyl-triethoxysilane; 3-aminopropyl-triethoxysilane; 3-aminopropyl-methyldiethoxysilane; 5-aminopentyl-trimethoxysilane; 5-aminopentyl-triethoxysilane and 3-aminopropyl-triisopropoxysilane. 3-aminopropyl-trimethoxysilane and 3-aminopropyl-triethoxysilane are particularly preferred.

Examples of optionally substituted maleic, fumaric or cinnamic acid esters suitable for use in the preparation of the polyaspartates include dimethyl, diethyl, dibutyl (e.g., di-n-butyl), diamyl, di-2-ethylhexyl esters and mixed esters based on mixture of these and/or other alkyl groups of maleic acid and fumaric acid; the methyl, ethyl and butyl esters of cinnamic acid; and the corresponding maleic, fumaric and cinnamic acid esters substituted by methyl in the 2- and/or 3-position. The dimethyl esters of maleic acid are preferred and the diethyl and dibutyl esters are especially preferred.

The reaction of primary amines with maleic, fumaric or cinnamic acid esters to form the aspartates of formula III is known and described, e.g., in EP-A-0,403,921; DE-OS 1,670,812; and DE-OS 2,158,945. While none of these publications suggests the reaction of alkoxysilane-functional amines with maleic or fumaric acid esters, this reaction is described in U.S. Pat. No. 5,364,955. The preparation of the aspartates may be carried out, for example, at a temperature of 0 to 100° C. using the starting materials in such proportions that at least 1, preferably 1, olefinic double bond is present for each primary amino group. Excess starting materials may be removed by distillation after the reaction. The reaction may be carried out with or without a solvent, but the use of a solvent is less preferred. If a solvent is used, dioxane is an example of a suitable solvent.

The compounds of formula III are colorless to pale yellow. They may be reacted with polyisocyanates to form the compounds of formula II without further purification.

Suitable polyisocyanates for preparing the compounds of formula II and ultimately formula I include monomeric diisocyanates, polyisocyanate adducts and NCO prepolymers having an average functionality of 1.5 to 6. The monomeric diisocyanates and polyisocyanate adducts preferably have an average functionality of 1.8 to 6, more preferably 2 to 6 and most preferably 2 to 4. The NCO prepolymers preferably have an average functionality of 1.4 to 4, more preferably 1.7 to 3 and most preferably 1.8 to 2.2.

Suitable monomeric diisocyanates may be represented by the formula

in which R represents an organic group obtained by removing the isocyanate groups from an organic diisocyanate having a molecular weight of about 112 to 1,000, preferably about 140 to 400 and more preferably 174 to 300. Diisocyanates preferred for the process according to the invention are those in which R represents a divalent aliphatic hydrocarbon group having 4 to 40, preferably 4 to 18 carbon atoms, a divalent cycloaliphatic hydrocarbon group having 5 to 15 carbon atoms, a divalent araliphatic hydrocarbon group having 7 to 15 carbon atoms or a divalent aromatic hydrocarbon group having 6 to 15 carbon atoms.

Examples of the suitable organic diisocyanates include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 1-isocyanato-3-isocyanatomethyl-3,5,5-trimethyl-cyclohexane (isophorone diisocyanate or IPDI), bis-(4-iso-cyanatocyclohexyl)-methane, 2,4'-diphenyl-methane diisocyanate, 1,3- and 1,4-bis-(isocyanatomethyl)-cyclohexane, bis-(4-isocyanato-3-methyl-cyclohexyl)-methane, α, α, α', α'-tetramethyl-1,3- and/or -1,4-xylylene diisocyanate, 1-isocyanato-1-methyl-4 (3)-isocyanatomethyl cyclohexane, 2,4- and/or 2,6-hexahydrotoluylene diisocyanate, 1,3- and/or 1,4-phenylene diisocyanate, 2,4-diisocyanatotoluene (and mixtures thereof with preferably up to 35 wt. %, based on the mixture, of 2,6-diisocyanato-toluene), 4,4'-diphenylmethane diisocyanate (and mixtures thereof with 2,4'-diphenyl-methane diisocyanate and/or 2,2'-diphenylmethane diisocyanate), 1,5-diisocyanato naphthalene and mixtures thereof.

Polyisocyanates containing 3 or more isocyanate groups such as 4-isocyanantomethyl-1,8-octamethylene diisocyanate and aromatic polyisocyanates such as 4,4',4"-triphenylmethane triisocyanate and polyphenyl polymethylene polyisocyanates obtained by phosgenating aniline/formaldehyde condensates may also be used.

Preferred organic diisocyanates include 1,6-hexamethylene diisocyanate, 1-isocyanato-3-isocyanatomethyl-3,5,5-trimethyl-cyclohexane (isophorone diisocyanate or IPDI), bis-(4-isocyanato-cyclohexyl)-methane, 1-isocyanato-1-methyl-4(3)-isocyanatomethyl cyclohexane, 2,4- and/or 2,6-toluylene diisocyanate, and 2,4- and/or 4,4'-diphenyl-methane diisocyanate.

In accordance with the present invention the polyisocyanate component may also be in the form of a polyisocyanate adduct. Suitable polyisocyanate adducts are those containing isocyanurate, uretdione, biuret, urethane, allophanate, carbodiimide and/or oxadiazine-trione groups. The polyisocyanates adducts have an NCO content of 5 to 30% by weight.

1) Isocyanurate group-containing polyisocyanates which may be prepared as set forth in DE-PS 2,616,416, EP-OS 3,765, EP-OS 10,589, EP-OS 47,452, U.S. Pat. No. 4,288, 586 and U.S. Pat. No. 4,324,879. The isocyanato-isocyanurates generally have an average NCO functionality of 3 to 3.5 and an NCO content of 5 to 30%, preferably 10 to 25% and most preferably 15 to 25% by weight.

2) Uretdione diisocyanates which may be prepared by oligomerizing a portion of the isocyanate groups of a diisocyanate in the presence of a suitable catalyst, e.g., a trialkyl phosphine catalyst, and which may be used in admixture with other aliphatic and/or cycloaliphatic polyisocyanates, particularly the isocyanurate group-containing polyisocyanates set forth under (1) above.

3) Biuret group-containing polyisocyanates which may be prepared according to the processes disclosed in U.S. Pat. Nos. 3,124,605; 3,358,010; 3,644,490; 3,862,973; 3,906, 126; 3,903,127; 4,051,165; 4,147,714; or 4,220,749 by using co-reactants such as water, tertiary alcohols, primary and secondary monoamines, and primary and/or secondary diamines. These polyisocyanates preferably have an NCO content of 18 to 22% by weight and an average NCO functionality of 3 to 3.5.

4) Urethane group-containing polyisocyanates which may be prepared in accordance with the process disclosed in U.S. Pat. No. 3,183,112 by reacting excess quantities of polyisocyanates, preferably diisocyanates, with low molecular weight glycols and polyols having molecular weights of less than 500, such as trimethylol propane, glycerine, 1,2-dihydroxy propane and mixtures thereof. The urethane group-containing polyisocyanates have a most preferred NCO content of 12 to 20% by weight and an (average) NCO functionality of 2.5 to 3.

5) Allophanate group-containing polyisocyanates which may be prepared according to the processes disclosed in U.S. Pat. Nos. 3,769,318, 4,160,080 and 4,177,342. The allophanate group-containing polyisocyanates have a most preferred NCO content of 12 to 21% by weight and an (average) NCO functionality of 2 to 4.5.

6) Isocyanurate and allophanate group-containing polyiso-cyanates which may be prepared in accordance with the processes set forth in U.S. Pat. Nos. 5,124,427, 5,208, 334 and 5,235,018, the disclosures of which are herein incorporated by reference, preferably polyisocyanates containing these groups in a ratio of monoisocyanurate groups to mono-allophanate groups of about 10:1 to 1:10, preferably about 5:1 to 1:7.

7) Carbodiimide group-containing polyisocyanates which may be prepared by oligomerizing di- or polyisocyanates in the presence of known carbodiimidization catalysts as described in DE-PS 1,092,007, U.S. Pat. Nos. 3,152,162 and DE-OS 2,504,400, 2,537,685 and 2,552,350.

8) Polyisocyanates containing oxadiazinetrione groups and containing the reaction product of two moles of a diisocyanate and one mole of carbon dioxide.

Preferred polyisocyanate adducts are the polyisocyanates containing isocyanurate groups, biuret groups, allophanate groups and/or uretdione groups.

The NCO prepolymers, which may also be used as the polyisocyanate component in accordance with the present invention, are prepared from the previously described monomeric polyisocyanates or polyisocyanate adducts, preferably monomeric diisocyanates, and organic compounds containing at least two isocyanate-reactive groups, preferably at least two hydroxy groups. These organic compounds include high molecular weight compounds having molecular weights of 500 to about 10,000, preferably 800 to about 8,000, and more preferably 1800 to 8,000, and optionally low molecular weight compounds having molecular weights below 500. The molecular weights are number average molecular weights ($M_n$) and are determined by end group analysis (OH and/or NH number). Products obtained by reacting polyisocyanates exclusively with low molecular weight compounds are polyisocyanates adducts containing urethane groups and are not considered to be NCO prepolymers.

Examples of the high molecular weight compounds are polyester polyols, polyether polyols, polyhydroxy polycarbonates, polyhydroxy polyacetals, polyhydroxy polyacrylates, polyhydroxy polyester amides and polyhydroxy polythioethers. The polyester polyols, polyether polyols and polyhydroxy polycarbonates are preferred, especially the polyether polyols.

Examples of suitable high molecular weight polyhydroxyl compounds include polyester polyols prepared from low molecular weight alcohols and polybasic carboxylic acids such as adipic acid, sebacic acid, phthalic acid, isophthalic acid, tetrahydrophthalic acid, hexahydrophthalic acid, maleic acid, the anhydrides of these acids and mixtures of these acids and/or acid anhydrides. Polylactones having hydroxyl groups, particularly poly-ε-caprolactone, are also suitable for producing the prepolymers.

Also suitable for preparing the prepolymers are polyether polyols, which may be obtained in known manner by the alkoxylation of suitable starter molecules. Examples of suitable starter molecules include polyols, water, organic polyamines having at least two N—H bonds and mixtures thereof. Suitable alkylene oxides for the alkoxylation reaction are preferably ethylene oxide and/or propylene oxide, which may be used in sequence or in admixture.

Other suitable polyols include polycarbonates having hydroxyl groups, which may be produced by the reaction of diols with phosgene or diaryl carbonates such as diphenyl carbonate.

Further details concerning the low molecular weight compounds and the starting materials and methods for preparing the high molecular weight polyhydroxy compounds are disclosed in U.S. Pat. No. 4,701,480, herein incorporated by reference.

Other examples include the known high molecular weight amine-functional compounds, which may be prepared by converting the terminal hydroxy groups of the polyols previously described to amino groups, and the high molecular weight polyaspartates and polyaldimines disclosed in U.S. Pat. No. 5,243,012 and 5,466,771, respectively, herein incorporated by reference.

These NCO prepolymers generally have an isocyanate content of 0.4 to 10% by weight, preferably 0.4 to 5% by weight and more preferably 0.5 to 2% by weight. The NCO prepolymers are produced by reacting the diisocyanates with the polyol component at a temperature of 40° to 120° C., preferably 50 to 100° C., at an NCO/OH equivalent ratio of 1.3:1 to 20:1, preferably 1.4:1 to 10:1. If chain extension via urethane groups is desired during the preparation of the isocyanate prepolymers, an NCO/OH equivalent ratio of 1.3:1 to 2:1 is selected. If chain extension is not desired, an excess of diisocyanate is preferably used, corresponding to an NCO/OH equivalent ratio of 4:1 to 20:1, preferably 5:1 to 10:1. The excess diisocyanate may optionally be removed by thin layer distillation when the reaction is completed. In accordance with the present invention NCO prepolymers also include NCO semi-prepolymers which contain unreacted starting polyisocyanates in addition to the urethane group-containing prepolymers.

The compounds of formula I containing alkoxysilane groups and hydantoin groups are prepared by reacting the polyisocyanates with the compounds of formula III at an equivalent ratio of aspartate groups (i.e., secondary amino groups) to isocyanate groups of approximately 1:1. The reaction is preferably carried out by incrementally adding the aspartate to the polyisocyanate. The reaction to form the urea group-containing intermediate is conducted at a temperature of 10° to 100° C., preferably 20° to 80° C and more preferably 20° to 50° C. After this addition reaction is complete the temperature is increased to 60 to 240° C., preferably 80° to 160° C. and more preferably 100° to 140° C, to convert the urea groups to hydantoin groups with the elimination of a monoalcohol.

Instead of forming the urea groups and hydantoin groups in two steps, the reaction may be carried out entirely at elevated temperatures in order to form the urea groups and hydantoin groups in one step. When conducting the reaction in one step, care must be taken to avoid the reaction between monoalcohols (which are obtained as a by-product during the formation of hydantoins) with isocyanate groups that have not been converted to urea groups. In either the one or two step process the conversion of urea groups to hydantoin groups may be carried out in the presence of catalysts, such as carboxylic acids, to reduce the temperature and/or the reaction time needed for this conversion.

The compounds of the present invention are suitable for the production of sealant (including caulks), coating or adhesive compositions which can be cross-linked by "silane polycondensation," i.e., the condensation of silane groups (Si—OR) to form siloxane groups (Si—O—Si). When used for this purpose, these compounds may be used as mixtures with suitable acidic or basic catalysts. Examples include acids such as paratoluene sulfonic acid; metallic salts such as dibutyl tin dilaurate; tertiary amines such as triethylamine or triethylene diamine; and mixtures of these catalysts. Low molecular weight, basic aminoalkyl trialkoxysilanes, such as those represented by formula IV, also accelerate hardening of the compounds according to the invention.

The polyurethane prepolymers having alkoxysilane and hydantoin groups according to the invention are valuable binders for the manufacture of isocyanate-free polyurethane sealants which crosslink via a silane polycondensation in the presence of atmospheric moisture.

To manufacture these sealants, the prepolymers having alkoxysilane and hydantoin groups are optionally mixed with additives, such as plasticizers, fillers, pigments, adjuvants, thixotropic agents, catalysts, according to known processes for sealant manufacture.

The crosslinked polymers are distinguished by excellent elastomeric properties, low surface tack and outstanding temperature stability.

The invention is further illustrated but is not intended to be limited by the following examples in which all parts and percentages are by weight unless otherwise specified.

EXAMPLES

Polyisocyanate 1

An isocyanurate group-containing polyisocyanate prepared from 1,6-hexamethylene diisocyanate and having an isocyanate content of 21.6%, a content of monomeric diisocyanate of <0.2% and a viscosity at 20° C. of 3000 mPa.s (available from Bayer Corporation as Desmodur N 3300).

Polyisocyanate 2

An isocyanurate group-containing polyisocyanate prepared from 1,6-hexamethylene diisocyanate and having an isocyanate content of 23%, a content of monomeric diisocyanate of <0.2% and a viscosity at 25° C. of 1200 mPa.s (available from Bayer Corporation as Desmodur XP-7014).

Polyisocyanate 3

A polyisocyanate which contains allophanate groups and isocyanurate groups, is prepared from 1,6-hexamethylene diisocyanate and has an isocyanate content of 19%, a content of monomeric diisocyanate of <0.2% and a viscosity at 25° C. of about 270 mPa.s (available from Bayer Corporation as Desmodur XP-7040).

Polyisocyanate 4

A polyisocyanate which contains allophanate groups and isocyanurate groups, is prepared from 1,6-hexamethylene diisocyanate and has an isocyanate content of 21.4%, a monoallophanate group content of 11%, a content of monomeric diisocyanate of <0.2% and a viscosity at 25° C. of about 1200 mPa.s (available from Bayer Corporation as Desmodur XP-7100).

Polyisocyanate 5

A mixture containing 70 parts by weight of a uretdione group-containing polyisocyanate, i.e., dimerized 1,6-hexamethylene diisocyanate and 30 parts by weight of N, N', N"-tris-(6-isocyanatohexyl)-isocyanurate together with minor quantities of higher homologs of both products and having a average viscosity of 150 mPa.s at 23° C. and an average NCO content of 22.5% (available from Bayer Corporation as Desmodur N 3400).

Polyisocyanate 6

An aniline/formaldehyde condensation product containing a mixture of diphenylmethane diisocyanate isomers as well as their higher homologs, having an NCO content of about 31% and a viscosity of about 40 mPa.s at 23° C. (available from Bayer Corporation as Mondur MRS-4).

Polyisocyanate 7

A biuret group-containing polyisocyanate prepared from 1,6-hexamethylene diisocyanate and having an isocyanate content of about 23%, a content of monomeric diisocyanate of <0.7% and a viscosity at 25° C. of 1300–2200 mPa.s (available from Bayer Corporation as Desmodur N 3200).

Silane Aspartates—General Procedure 8.27 equiv of 3-aminopropyltrialkoxysilane were added to a 5 liter flask fitted with agitator, thermocouple, nitrogen inlet and addition funnel with condenser. 8.27 equiv of dialkyl maleate were added dropwise over a period of 2 hours. The temperature of the reactor was maintained at 25° C. during the addition. The reactor was maintained at 25° C. for an additional 5 hours at which time the product was poured into glass containers and sealed under a blanket of nitrogen. After one week the unsaturation number was 0.6 indicating the reaction was ~99% complete.

| The following compounds were prepared: | Viscosity at 25° C. |
|---|---|
| N-(3-triethoxysilylpropyl) aspartic acid diethyl ester | 9 mPa · s |
| N-(3-triethoxysilylpropyl) aspartic acid dibutyl ester | 11 mPa · s |
| N-(3-trimethoxysilylpropyl) aspartic acid diethyl ester | 11 mPa · s |
| N-(3-trimethoxysilylpropyl) aspartic acid dibutyl ester | 18 mPa · s |

Alkoxysilane Resin 1

Tris-[3-(trimethoxysily)propyl]-isocyanurate (Silquest Y-11597, available from Witco Corp.)

EXAMPLE 1

669.0 parts (1.7 equiv) of N-(3-triethoxysilylpropyl)-aspartic acid diethyl ester and 331 parts (1.7 equiv) of polyisocyanate 1 were added to a three neck, 5 liter, round bottom flask equipped with an agitator, nitrogen inlet, thermocouple and condenser. The reaction to form the urea was accompanied by an exotherm which increased the temperature of the reaction mixture to 80° C. The reaction was held at 80° C. for 14 hours at which time the IR spectrum showed no residual isocyanate in the urea. The product was cooled and the viscosity of the product was determined to be >300,000 at 25° C.

500 parts of the urea were combined with 5 parts of glacial acetic acid in a 1 liter flask fitted with an agitator, nitrogen inlet, thermocouple and condenser with vacuum outlet. The reaction temperature was increased to 106° C. where the reaction mixture began to reflux as ethanol was released from the cyclization reaction. When the IR spectrum showed no residual urea, the reactor was cooled to 75° C. and a vacuum was applied at 1 torr. 38.8 parts of ethanol (theoretical 40.8 parts) were isolated. The product yield was 463 parts. The product had a viscosity of >101,000 mPa.s at 25° C. Analysis via GC, IR, NMR and GPC were consistent with the following structure:

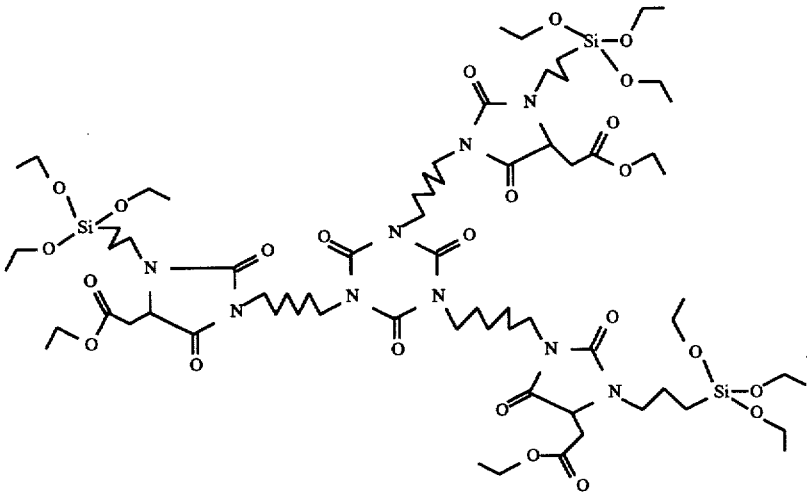

EXAMPLES 2–16

Example 1 was repeated with the exception that Polyisocyanate 1 was replaced with an equivalent amount of Polyisocyanates 2–7 and also with 1,6-hexamethylene diisocyanate (HDI), isophorone diisocyanate (IPDI) and bis-(4-isocyanatocyclohexyl)-methane (HMDI). In addition, the aspartate reacted with the polyisocyanate was also varied as set forth in Table 1. The viscosities of the resulting products containing alkoxysilane groups and hydantoin groups are set forth in Table 1.

TABLE 1

| Example No. | Polyisocyanate | Trialkoxy Silane | Dialkyl Maleate | Viscosity of Hydantoin (mPa · s at 25° C.) |
|---|---|---|---|---|
| 1 | Polyisocyanate 1 | Ethoxy | Ethyl | 101,000 |
| 2 | Polyisocyanate 1 | Methoxy | Ethyl | |
| 3 | Polyisocyanate 2 | Ethoxy | Ethyl | 86,700 |
| 4 | Polyisocyanate 3 | Ethoxy | Ethyl | 22,300 |
| 5 | Polyisocyanate 4 | Ethoxy | Ethyl | 57,700 |
| 6 | Polyisocyanate 5 | Ethoxy | Ethyl | 59,200 |
| 7 | Polyisocyanate 5 | Methoxy | Ethyl | 24,300 |
| 8 | Polyisocyanate 6 | Methoxy | Ethyl | >300,000 |

TABLE 1-continued

| Example No. | Polyisocyanate | Trialkoxy Silane | Dialkyl Maleate | Viscosity of Hydantoin (mPa · s at 25° C.) |
|---|---|---|---|---|
| 9 | Polyisocyanate 7 | Ethoxy | Ethyl | 118,000 |
| 10 | HDI | Ethoxy | Ethyl | 23,300 |
| 11 | HDI | Methoxy | Ethyl | 1200 |
| 12 | HDI | Ethoxy | Butyl | 950 |
| 13 | HDI | Methoxy | Butyl | 780 |
| 14 | IPDI | Ethoxy | Ethyl | 132,000 |
| 15 | IPDI | Methoxy | Ethyl | >300,000 |
| 16 | HMDI | Methoxy | Ethyl | >300,000 |

EXAMPLES 17–20

Preparation of Coatings from the Urea and Hydantoin Group-Containing Compounds of Example 1

Coatings were prepared from the urea group-containing and the corresponding hydantoin group-containing compounds prepared in Example 1. In addition to these compounds the coating compositions contained the ingredients set forth in Table 2. The levelling agent was Byk 358, a silicone based additive, available form Byk Chemie; the catalyst was dibutyl tin dilaurate. The properties of the resulting coatings are also set forth in Table 2.

TABLE 2

| | Example | | | |
|---|---|---|---|---|
| | 17 | 18 | 19 | 20 |
| Ingredient | | | | |
| Urea from Ex. 1 | 200 | 0 | 100 | 0 |
| Hydantoin from Ex. 1 | 0 | 200 | 0 | 100 |
| Alkoxysilane Resin 1 | 0 | 0 | 100 | 100 |
| Ethanol | 200 | 200 | 200 | 200 |
| Levelling Agent | 1 | 1 | 1 | 1 |
| Catalyst | 2 | 2 | 2 | 2 |
| Pendulum Hardness, sec. | | | | |
| Day | | | | |
| 1 | 0 | 0 | 0 | 0 |
| 4 | 13 | 15 | 61 | 55 |
| 10 | 39 | 52 | 123 | 87 |
| 26 | 178 | 181 | 193 | 171 |
| Pencil Hardness, Day 26 | 2B | 2B | 3H | 2H |
| MEK Double Rubs | | | | |
| Day | | | | |
| 1 | wet | wet | wet | wet |
| 4 | 1 | 4 | 70 | 40 |
| 10 | 25 | 32 | 100 | 100 |
| 26 | 100 | 100 | 100 | 100 |
| Chemical Spot Test: 1, 4 and 24 hour spots | | | | |
| Gasoline | ne,s,s | ne,s,s | ne,ne,ne | ne,ne,ne |
| Motor oil | ne,ne,ne | ne,ne,ne | ne,ne,ne | ne,ne,ne |
| Methyl ethyl ketone | ds,ds,ds | ds,ds,ds | ne,ne,ne | ne,ne,ne |
| Isopropanol | s,s,s | s,s,s | ne,ne,ne | ne,ne,ne |
| Propylene glycol methyl ether acetate | s,s,ds | s,ds,ds | ne,ne,ne | ne,ne,ne |
| HCl, 37% | ne,st,bl | ne,st,bl | ne,st,ds | ne,st,ds |
| $H_2SO_4$, 50% | ne,ne,ne | ne,ne,ne | ne,ne,st | ne,ne,st |
| Acetic acid | ds,ds,ds | ds,ds,ds | s,ds,ds | s,ds,ds |
| Aniline | ds,ds,ds | ds,ds,ds | ne,ne,ne | ne,ne,ds |
| Tg, °C. | 59 | 51 | 61 | 69 |

MEK double rubs was determined by wetting a cloth with methyl ethyl ketone and then rubbing each panel up to 100 times. A double rub consists of one back and forth rub against the coated panel. Values of less than 100 indicate the number of double rubs before the coatings was destroyed.

Pendulum hardness was determined in accordance with ASTM D-4366-87 (Koenig Pendulum Hardness).

Chemical spot resistance was determined by placing a drop of the particular liquid on a coated panel and covering it with a 4 oz. glass jar. For those solvents that rapidly evaporate a cotton ball was placed on the coated panel liquids and kept saturated. After the appropriate time interval, the coated panels were washed, evaluated to determine the effect of the liquid, and assigned one of the following classifications:

| ne | No effect |
|---|---|
| s | Film softened, but recovered after 1 hour |
| ds | Dissolved |
| st | Stained |
| bl | Blistered |

EXAMPLES 21–25

Coating compositions were prepared by adding 1 part of dibutyl tin dilaurate to 100 parts (70% solids) of the hydantoin group-containing compound of Example 1, to alkoxysilane resin 1 or to mixtures thereof as set forth in Table 3. The resins were present as a 70% solution in toluene. The compositions were applied to steel panels at a wet film thickness of 5 mils (3.5 mils dry film thickness). The properties of the resulting coatings are set forth in Table 3.

TABLE 3

| Example | 21 | 22 | 23 | 24 | 25 |
|---|---|---|---|---|---|
| Components | | | | | |
| Hydantoin from Ex. 1 | 0 | 25 | 50 | 75 | 100 |
| Alkoxysilane Resin 1 | 100 | 75 | 50 | 25 | 0 |
| Coating Properties | | | | | |
| Pendulum Hardness, secs. | | | | | |
| 1 day | 148 | 57 | 32 | 5 | 0 |
| 3 days | 169 | 102 | 52 | 10 | 10 |
| 16 days | 184 | 145 | 101 | 52 | 81 |
| 25 days | 183 | 153 | 127 | 94 | 98 |
| MEK, double rubs | | | | | |
| 1 day | 100 | 10 | 2 | 1 | 1 |
| 2 days | 100 | 100 | 10 | 1 | 1 |
| | | | soft | | |
| 16 days | 100 | 100 | 100 | 100 | 100 |
| | | | | | soft |
| Film appearance | cracked, curled | smooth, glossy | smooth, glossy | smooth, glossy | smooth, glossy |
| Chemical Spot Test, 1, 4 and 24 hour spots | | | | | |
| Gasoline | — | ne,ne,ne | ne,ne,ne | ne,s,ds | s,s,ds |
| Motor oil | — | ne,ne,ne | ne,ne,ne | ne,ne,ne | ne,ne,ne |
| Methyl ethyl ketone | — | s,s,ds | ne,s,s | ne,s,ds | ds,ds,ds |
| Isopropanol | — | ne,s,s | ne,s,s | ne,s,s | s,s,s |
| Propylene glycol methyl ether acetate | — | ne,en,ne | ne,ne,ne | ne,ne,ne | ne,ne,ne |
| HCl, 37% | — | s,ds,ds | s,s,st | ne,st,ds | ne,ne,ne |
| $H_2SO_4$, 50% | — | ne,ne,ne | ne,ne,ne | ne,ne,ne | ne,ne,ne |
| Acetic acid | — | ne,ds,ds | ds,ds,ds | ds,ds,ds | ds,ds,ds |
| Aniline | — | ne,st,st | ne,ds,ds | s,ds,ds | ds,ds,ds |

Examples 22–24 demonstrate the ability of the compounds containing hydantoin groups to flexibilize other silane containing compounds that are not capable of forming films on their own.

EXAMPLES 26-35

Coatings were prepared from the hydantoin group-containing compounds and additional ingredients set forth in Table 4. The levelling agent was Byk 358, a silicone based additive, available form Byk Chemie; the catalysts were dibutyl tin dilaurate (DBTDL) and paratoluene sulfonic acid (PTSA). The properties of the resulting coatings are also set forth in Table 4.

g (0.2 equiv.) of 2,4-diisocyanatotoluene and 100 g (0.1 equiv.) of a polyether diol (having an OH number of 56 and produced by the propoxylation of propylene glycol). The reaction mixture was heated to 80° C. and held for 6 hours until the NCO content was 3.4% (3.6% theoretical). The product was cooled to 40° C. and 14.7 g (0.04 equiv.) of N-(3-trimethoxy-silylpropyl)-aspartic acid diethyl ester was added with stirring. After stirring for 3 hours no isocyanate bands were detected in the IR spectrum. The viscosity of the urea was 24,200 mPa.s.

The reaction temperature was increased to 106° C. where the reaction mixture began to reflux as methanol was

TABLE 4

| | Example | | | | | | | | | |
|---|---|---|---|---|---|---|---|---|---|---|
| Ingredients | 26 | 27 | 28 | 29 | 30 | 31 | 32 | 33 | 34 | 35 |
| Hydantoin from | | | | | | | | | | |
| Ex. 1 | 20 | 0 | 0 | 0 | 0 | 10 | 0 | 0 | 0 | 0 |
| Ex. 7 | 0 | 20 | 0 | 0 | 0 | 0 | 10 | 0 | 0 | 0 |
| Ex. 8 | 0 | 0 | 20 | 0 | 0 | 0 | 0 | 10 | 0 | 0 |
| Ex. 2 | 0 | 0 | 0 | 20 | 0 | 0 | 0 | 0 | 10 | 0 |
| Ex. 3 | 0 | 0 | 0 | 0 | 20 | 0 | 0 | 0 | 0 | 10 |
| Alkoxysilane resin 1 | 0 | 0 | 0 | 0 | 0 | 10 | 10 | 10 | 10 | 10 |
| Levelling agent | 0.1 | 0.1 | 0.1 | 0.1 | 0.1 | 0.1 | 0.1 | 0.1 | 0.1 | 0.1 |
| Ethanol | 20 | 20 | 20 | 20 | 20 | 20 | 20 | 20 | 20 | 20 |
| PTSA | 0.5 | 0.5 | 0.5 | 0.5 | 0.5 | 0.35 | 0.35 | 0.35 | 0.35 | 0.35 |
| DBTL | 0 | 0 | 0 | 0 | 0 | 0.35 | 0.35 | 0.35 | 0.35 | 0.35 |
| Pencil hardness | | | | | | | | | | |
| Day 4 | 2H | 2H | 3H | shattered | 2H | H | F | 2B | 2H | F |
| Day 7 | 3H | 2H | 3H | — | 2H | 3H | F | 2B | 2H | F |
| Day 14 | 3H | 3H | 3H | — | 2H | 2H | 2H | HB | 2H | 2H |
| Pendulum Hardness, sec. | | | | | | | | | | |
| Day 4 | 190 | 196 | 167 | 0 | 168 | 63 | 132 | 90 | 158 | 116 |
| Day 7 | 195 | 197 | 154 | 0 | 182 | 84 | 155 | 101 | 168 | 129 |
| Day 14 | 189 | 161 | 245 | 0 | 168 | 81 | 85 | 155 | 160 | 122 |

EXAMPLE 36

To a three neck, round bottom flask fitted with agitator, nitrogen inlet, thermocouple and condenser were added 15.5 g (0.14 equiv.) of isophorone diisocyanate and 200 g (0.1 equiv.) of a polyether diol (having an OH number of 28 and produced by the propoxylation of propylene glycol and subsequent ethoxylation of the propoxylation product). The reaction mixture was heated to 80° C. and held for 6 hours until the NCO content was 0.9% (0.8% theoretical). The product was cooled to 40° C. and 14.7 g (0.04 equiv.) of N-(3-trimethoxy-silylpropyl) aspartic acid diethyl ester was added with stirring. After stirring for 3 hours no isocyanate bands were detected in the IR spectrum. The viscosity of the urea was 111,000 mPa.s.

The urea intermediate was mixed with 1% glacial acetic acid as catalyst in a three neck, round bottom flask fitted with an agitator, nitrogen inlet, thermocouple and condenser with vacuum outlet. The reaction temperature was increased to 106° C. where the reaction mixture began to reflux as methanol was released from the cyclization reaction. When the IR spectrum showed no residual urea, the reactor was cooled to 75° C. and a vacuum was applied at 1 torr until the theoretical amount of methanol was isolated. The viscosity of the resulting hydantoin was >300,000 mPa.s.

EXAMPLE 37

To a three neck, round bottom flask fitted with agitator, nitrogen inlet, thermocouple and condenser were added 17.4 released from the cyclization reaction. When the IR spectrum showed no residual urea, the reactor was cooled to 75° C. and a vacuum was applied at 1 torr until the theoretical amount of methanol was isolated. The viscosity of the resulting hydantoin was 29,400 mPa.s.

EXAMPLE 38

1000 g of a polyether diol (having an OH number of 56 and produced by the propoxylation of propylene glycol) were reacted with 122 g of 2,4-diisocyanatotoluene at 60° C. until the theoretical NCO content of 1.5% was obtained. After cooling to 40° C., 146 g of N-(3-triethoxysilylpropyl)-aspartic acid diethyl ester (produced according to EP-A 596,360, Example 2, U.S. Pat. No. 5,364,955, herein incorporated by reference) were steadily added and stirring was continued until no further isocyanate bands were detected in the IR spectrum. Cyclocondensation then took place by heating to 100° C. and a total of 12 g of methanol were distilled off under reduced pressure. The resulting product had a viscosity of 69,000 mPa.s (23° C.).

A film poured onto a glass plate cured under catalysis with dibutyltin diacetate within 24 hours to form a flexible plastic with a Shore A hardness of 28.

EXAMPLE 39

Manufacture of an Isocyanate-Free Polyurethane Sealant

The following components could be processed to form a sealant in a conventional commercial planetary motion mixer:

33 parts of the reaction product from Example 36
37 parts of chalk
6 parts of titanium dioxide
16 parts of plasticizer (Unimoll BB, Bayer AG)
7 parts of hydrated castor oil
1 part of dibutyltin diacetate The resulting sealant would be expected to have excellent stability, to adhere to virtually all substrates and to cure with a skin formation time of approximately five hours.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A compound containing alkoxysilane and hydantoin groups and corresponding to the formula

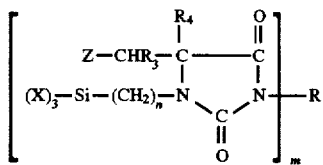

wherein
X represents identical or different organic groups which are inert to isocyanate groups below 100° C., provided that at least one of these groups is an alkoxy group,
Z represents $COOR_1$ or an aromatic ring,
R represents the residue obtained by removing the isocyanate groups from an organic monomeric polyisocyanate, a polyisocyanate adduct or an NCO prepolymer,
$R_1$ represents an organic group which is inert to isocyanate groups at a temperature of 100° C. or less,
$R_3$ and $R_4$ are identical or different and represent hydrogen or organic groups which are inert to isocyanate groups at a temperature of 100° C. or less,
n is an integer from 1 to 8 and
m has an average value of 1.5 to 6.

2. The compound of claim 1 wherein
X represents identical or different alkyl or alkoxy groups having 1 to 4 carbon atoms,
Z represents $COOR_1$,
$R_1$ is an alkyl group having 1 to 8 carbon atoms,
$R_3$ and $R_4$ represent hydrogen and
n is an integer from 2 to 4.

3. The compound of claim 1 wherein
X represents identical or different alkoxy groups having 1 to 4 carbon atoms,
Z represents $COOR_1$,
$R_1$ is methyl, ethyl or butyl,
$R_3$ and $R_4$ represent hydrogen and
n is 3.

4. The compound of claim 1 wherein R represents the residue obtained by removing the isocyanate groups from an organic monomeric polyisocyanate.

5. The compound of claim 2 wherein R represents the residue obtained by removing the isocyanate groups from an organic monomeric polyisocyanate.

6. The compound of claim 3 wherein R represents the residue obtained by removing the isocyanate groups from an organic monomeric polyisocyanate.

7. The compound of claim 1 wherein R represents the residue obtained by removing the isocyanate groups from a polyisocyanate adduct.

8. The compound of claim 2 wherein R represents the residue obtained by removing the isocyanate groups from a polyisocyanate adduct.

9. The compound of claim 3 wherein R represents the residue obtained by removing the isocyanate groups from a polyisocyanate adduct.

10. The compound of claim 1 wherein R represents the residue obtained by removing the isocyanate groups from a polyisocyanate adduct containing isocyanurate groups, biuret groups, allophanate groups and/or uretdione groups.

11. The compound of claim 2 wherein R represents the residue obtained by removing the isocyanate groups from a polyisocyanate adduct containing isocyanurate groups, biuret groups, allophanate groups and/or uretdione groups.

12. The compound of claim 3 wherein R represents the residue obtained by removing the isocyanate groups from a polyisocyanate adduct containing isocyanurate groups, biuret groups, allophanate groups and/or uretdione groups.

13. The compound of claim 1 wherein R represents the residue obtained by removing the isocyanate groups from an NCO prepolymer.

14. The compound of claim 2 wherein R represents the residue obtained by removing the isocyanate groups from an NCO prepolymer.

15. The compound of claim 3 wherein R represents the residue obtained by removing the isocyanate groups from an NCO prepolymer.

16. A compound containing alkoxysilane and hydantoin groups and corresponding to the formula

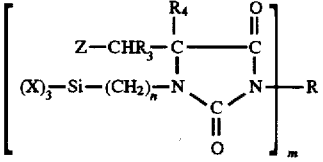

wherein
X represents identical or different alkyl or alkoxy groups having 1 to 4 carbon atoms, provided that at least one of these groups is an alkoxy group,
Z represents $COOR_1$,
R represents the residue obtained by removing the isocyanate groups from an NCO prepolymer having an NCO content of 0.4 to 5% by weight,
$R_1$ represents a an alkyl group having 1 to 8 carbon atoms,
$R_3$ and $R_4$ represent hydrogen,
n is 3 and
m has an average value of 1.5 to 4.

17. The compound of claim 16 wherein said NCO prepolymer is based on a polyether polyol.

18. The compound of claim 16 wherein m has an average value of 1.8 to 2.2.

19. The compound of claim 17 wherein m has an average value of 1.8 to 2.2.

20. A coating, sealant or adhesive prepared from the compound of claim 1.

21. A moisture-curable composition containing the compound of claim 16.

* * * * *